(12) United States Patent
Shirakata et al.

(10) Patent No.: US 9,969,406 B2
(45) Date of Patent: May 15, 2018

(54) ATTENTION CALLING SYSTEM FOR VEHICLE

(71) Applicant: HONDA MOTOR CO., LTD., Tokyo (JP)

(72) Inventors: Tetsuro Shirakata, Wako (JP); Naotaka Kumakiri, Wako (JP); Hiroyuki Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 15/046,739

(22) Filed: Feb. 18, 2016

(65) Prior Publication Data

US 2016/0250968 A1 Sep. 1, 2016

(30) Foreign Application Priority Data

Feb. 27, 2015 (JP) ................................. 2015-037660

(51) Int. Cl.
 *B60W 50/16* (2012.01)
 *B60K 28/06* (2006.01)
 (Continued)

(52) U.S. Cl.
 CPC ........... *B60W 50/16* (2013.01); *B60K 28/066* (2013.01); *B60W 2040/0818* (2013.01);
 (Continued)

(58) Field of Classification Search
 CPC ........ B60K 28/066; B60W 2040/0818; B60W 2050/143; B60W 2050/146;
 (Continued)

(56) References Cited

U.S. PATENT DOCUMENTS 8,725,311 B1 * 5/2014 Breed .................... G08B 21/06
 600/300
2004/0044293 A1  3/2004 Burton
 (Continued)

FOREIGN PATENT DOCUMENTS

DE  102008038816  2/2010
DE  102012221090  5/2013
 (Continued)

OTHER PUBLICATIONS

Japanese Office Action dated Oct. 18, 2016.
 (Continued)

*Primary Examiner* — Nader Bolourchi
(74) *Attorney, Agent, or Firm* — Rankin, Hill & Clark LLP

(57) ABSTRACT

An attention calling system for a vehicle, which is capable of performing an alarm by presenting tactile information while causing a driver to have a feeling of being convinced and a feeling of trust, thereby making it possible to effectively and appropriately call attention of the driver. In the attention calling system according to the present invention, the attention level of the driver is estimated, and an abnormal behavior (unstableness) of the vehicle is detected. Then, on condition that the estimated attention level of the driver is lower than a predetermined level and the abnormal behavior of the vehicle is detected, the tactile information is presented to the driver as an alarm for calling attention of the driver.

8 Claims, 7 Drawing Sheets

(51) Int. Cl.
*B60W 40/08* (2012.01)
*B60W 50/14* (2012.01)

(52) U.S. Cl.
CPC . *B60W 2050/143* (2013.01); *B60W 2050/146* (2013.01); *B60W 2520/10* (2013.01); *B60W 2520/14* (2013.01); *B60W 2520/28* (2013.01); *B60W 2540/18* (2013.01)

(58) Field of Classification Search
CPC ......... B60W 2520/10; B60W 2520/14; B60W 2520/28; B60W 2540/18; B60W 50/16
USPC ........................................................ 340/576
See application file for complete search history.

(56) References Cited

U.S. PATENT DOCUMENTS

| | | | |
|---|---|---|---|
| 2004/0209594 A1 | 10/2004 | Naboulsi | |
| 2005/0030184 A1 | 2/2005 | Victor | |
| 2007/0182529 A1 | 8/2007 | Dobler et al. | |
| 2011/0118929 A1* | 5/2011 | Takae | B60W 50/16 701/31.4 |
| 2011/0187520 A1* | 8/2011 | Filev | B60W 50/16 340/438 |
| 2012/0212353 A1 | 8/2012 | Fung et al. | |
| 2014/0276090 A1* | 9/2014 | Breed | A61B 5/18 600/473 |
| 2016/0001781 A1* | 1/2016 | Fung | G06F 19/345 701/36 |
| 2016/0117947 A1* | 4/2016 | Misu | G09B 9/04 434/62 |

FOREIGN PATENT DOCUMENTS

| | | |
|---|---|---|
| DE | 102012001741 | 8/2013 |
| JP | 9-267660 | 10/1997 |
| JP | 2005-062911 | 3/2005 |
| JP | 2006-318159 | 11/2006 |
| JP | 2007-265377 | 10/2007 |
| JP | 2007-304705 | 11/2007 |
| JP | 2014-071628 | 4/2014 |
| WO | 2015/000087 | 1/2015 |

OTHER PUBLICATIONS

German Office Action dated Aug. 29, 2016 with English Translation, 18 pages.
German Search Report dated Aug. 29, 2016 with English Translation, 20 pages.

* cited by examiner

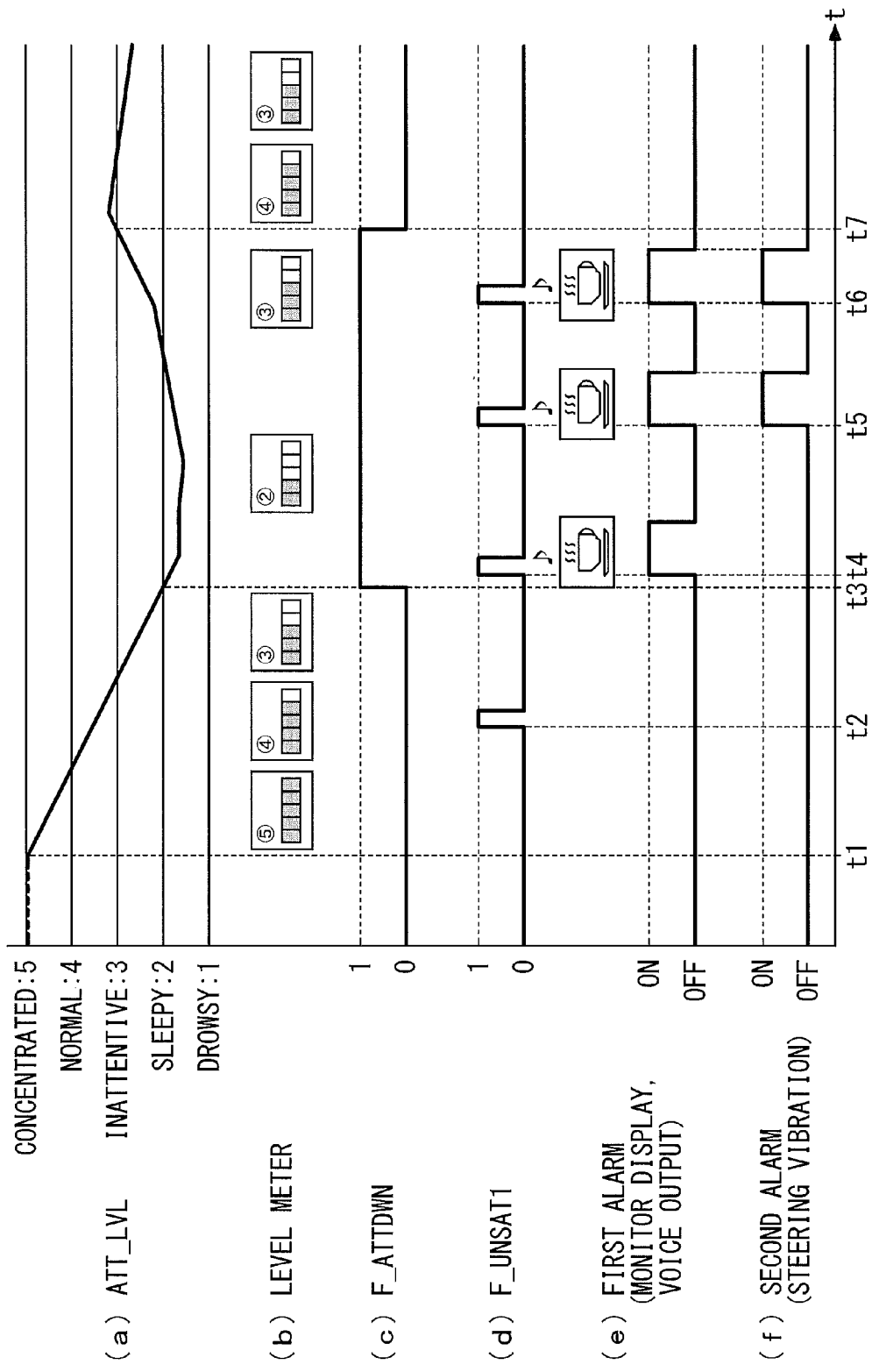

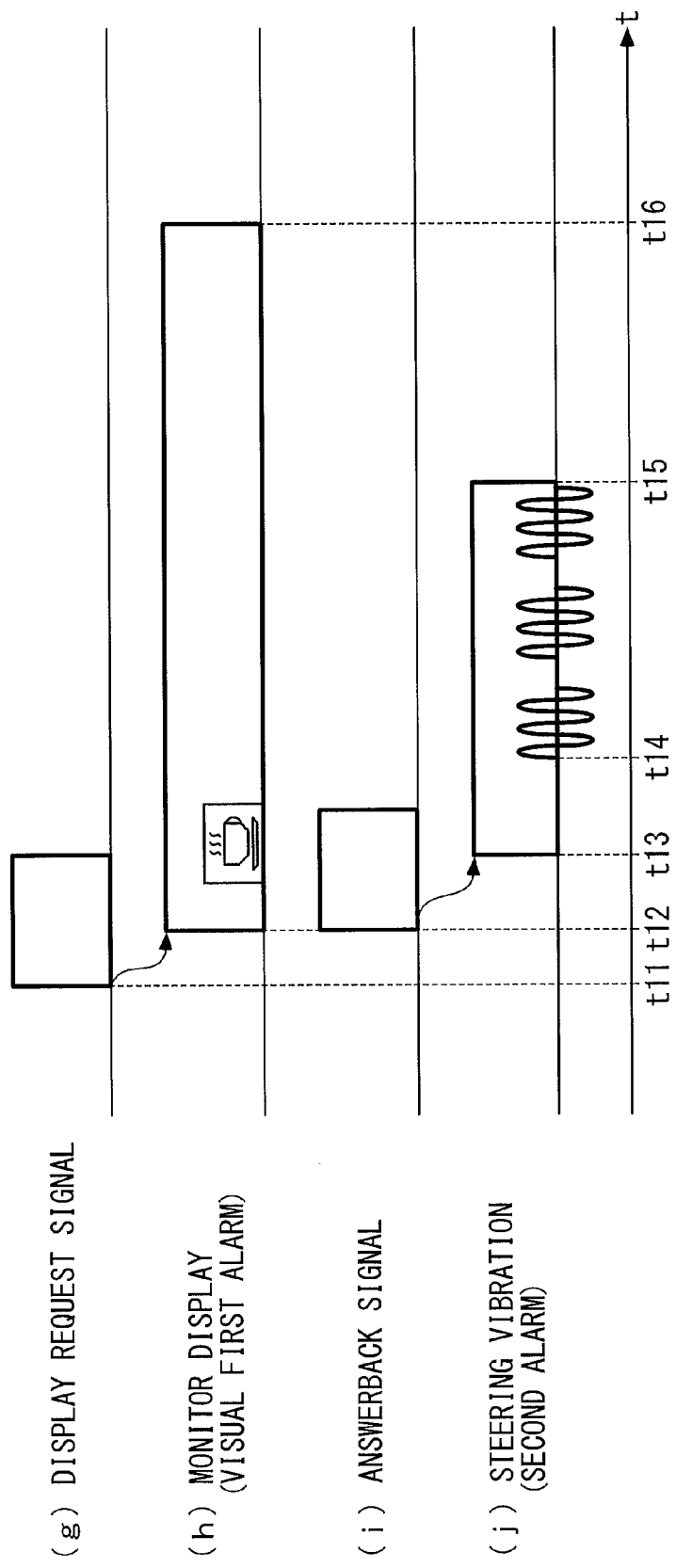

ATTENTION CALLING SYSTEM FOR VEHICLE

BACKGROUND OF THE INVENTION

Field of the Invention

The present invention relates to an attention calling system for a vehicle, which calls attention of a driver when an attention level of the driver to driving the vehicle is lowered.

Description of the Related Art

As a conventional attention calling system for a vehicle, there has been known, for example, one disclosed in Japanese Laid-Open Patent Publication (Kokai) No. H9-267660. In this system, an alertness degree of a driver is determined at predetermined time intervals, based on a steering amount obtained from operation information of a steering wheel, and the like, and alertness degrees determined by a plurality of times of determination are displayed in order on a display device at a driver's seat. Further, when there is an alertness degree determined to be not higher than a predetermined level, the color or content of a display thereof on the display device is changed or a warning sound or a voice message is output, as an alarm for calling attention of the driver.

Further, as another conventional attention calling system for a vehicle, there has been known, for example, one disclosed in Japanese Laid-Open Patent Publication (Kokai) No. 2005-62911. In this system, by analyzing an image of a driver photographed by an in-cabin camera, a state of the driver (inattentive driving or drowsy driving) is determined, and a level of danger is evaluated e.g. on a scale from 1 to 10. Then, as the level of danger is higher, a stronger alarm is performed to call attention of the driver. For example, in a case where the level of danger is low, a warning sound is output or a warning message is displayed on a monitor screen, whereas when the level of danger rises, in addition to these operations, an alarm is performed by vibrating a seat or a steering wheel.

In general, when a vehicle is traveling without any problem, a driver of the vehicle is often not very aware of a level of attention to driving or a risk of driving due to reduced attention. However, in the attention calling system disclosed in Japanese Laid-Open Patent Publication (Kokai) No. H9-267660, with indifference to such a feeling or awareness of the driver, an alertness degree of the driver is objectively determined based on operation information of the steering wheel and the like, and an alarm is performed based on a result of the determination. For this reason, the alarm is sometimes given in a state in which the driver is unaware of reduced attention and the risk of driving. In this case, since the driver cannot understand why the alarm has been given at the time, the driver has a feeling of strangeness or a feeling of distrust. Further, without a feeling of trust, the driver does not obediently follow the alarm, and hence it is impossible to effectively call the attention of the driver by the alarm.

Similarly, in the attention calling system disclosed in Japanese Laid-Open Patent Publication (Kokai) No. 2005-62911, with indifference to feeling or awareness of the driver, a state of a driver and a level of danger are objectively determined and evaluated, respectively, based on a photographed image of the driver. Therefore, it sometimes occurs that under a situation where the driver is unaware of reduced attention and the risk of driving, a high danger level is set and an alarm is issued. As a consequence, similar to the attention calling system disclosed in Japanese Laid-Open Patent Publication (Kokai) No. H9-267660, it is impossible to cause the driver to have a feeling of trust, and hence it is also impossible to effectively call the attention of the driver by the alarm. Further, in this system, an alarm to the driver is performed using tactile information having a strong stimulus by vibration of a seat or the steering wheel, and hence the feeling of strangeness or feeling of distrust of the driver becomes stronger than in the case of the attention calling system disclosed in Japanese Laid-Open Patent Publication (Kokai) No. H9-267660 in which an alarm is performed via a visual sense or an auditory sense.

SUMMARY OF THE INVENTION

It is an object of the present invention to provide an attention calling system for a vehicle, which is capable of performing an alarm by presenting tactile information while causing a driver to have a feeling of being convinced and a feeling of trust, thereby making it possible to effectively and appropriately call attention of the driver.

To attain the above object, the present invention provides an attention calling system for a vehicle, which calls attention of a driver when an attention level of the driver to driving the vehicle is lowered, comprising attention level estimation means for estimating the attention level of the driver, abnormal behavior detection means for detecting a predetermined abnormal behavior of the vehicle, and alarm means including tactile information-presenting means for presenting tactile information via a tactile sense to the driver, wherein the alarm means performs presentation of the tactile information by the tactile information-presenting means, as an alarm for calling attention of the driver, on condition that the estimated attention level of the driver is lower than a predetermined level and the abnormal behavior of the vehicle is detected.

According to this attention calling system, the attention level of the driver is estimated, and the predetermined abnormal behavior of the vehicle is detected. Then, the alarm for calling the attention of the driver is performed on condition that the estimated attention level of the driver is lower than the predetermined level and also the abnormal behavior of the vehicle is detected. That is, the alarm is not performed merely when the estimated attention level of the driver has become lower than the predetermined, but in addition to this, when the abnormal behavior of the vehicle is detected, the alarm is performed. As a consequence, the alarm is performed in a state where a risk which is objectively determined based on the lowering of the estimated attention level of the driver matches a risk which the driver feels due to occurrence of the abnormal behavior of the vehicle, so that the driver can accept the alarm without a feeling of strangeness but with a feeling of being convinced. Further, as this alarm, tactile information having a strong stimulus and a high messaging property is given to the driver. From the above, it is possible to perform the alarm by presentation of the tactile information to the driver while causing the driver to have a feeling of being convinced and a feeling of trust, thereby making it possible to effectively and appropriately call the attention of the driver.

Preferably, the alarm means further includes first alarm means for presenting information via at least one of an auditory sense and a visual sense to the driver, and the alarm means performs presentation of the information by the first alarm means, as a first alarm, when the attention level of the driver has become lower than the predetermined level, and performs presentation of the tactile information by the tactile information-presenting means, as a second alarm, on condition that the first alarm has been performed at least once within a predetermined driving time period of the vehicle.

With the configuration of the preferred embodiment, when the attention level of the driver has become lower than the predetermined level, presentation of the information by the auditory sense and/or the visual sense to the driver is performed as a first alarm. Further, presentation of the tactile information by the tactile information-presenting means is performed as a second alarm, on further condition that the first alarm has been performed within the predetermined driving time period of the vehicle. As described above, in advance of execution of the second alarm, when the attention level of the driver has become lower than the predetermined level, the first alarm is performed by sound for the auditory sense and display for the visual sense. With this, the driver can smoothly accept the second alarm without feeling abruptness, and therefore, it is possible to further enhance the driver's feeling of being convinced and trust, and more effectively call the attention of the driver.

More preferably, the alarm means performs the second alarm on condition that the first alarm is being performed.

With the configuration of the preferred embodiment, the second alarm is performed during execution of the first alarm simultaneously therewith, and hence the driver can more easily understand the relationship between the two alarms, particularly the relationship therebetween that the second alarm is performed due to lowering of the attention level of the driver, which is indicated by the first alarm, whereby it is possible to further enhance the driver's feeling of being convinced and trust, and more effectively call the attention of the driver by the second alarm.

Further preferably, the tactile information-presenting means is configured to present the tactile information to the driver by vibrating an operation member operated by the driver, and when the alarm means performs the second alarm during execution of the first alarm, the alarm means synchronizes the presentation of the information by the first alarm means and vibration of the operation member by the tactile information-presenting means with each other.

With the configuration of the preferred embodiment, the operation member operated by the driver is vibrated, whereby the vibration of the operation member is presented to the driver as the tactile information (second alarm). Further, when the second alarm is performed during execution of the first alarm, the presentation of the information by the first alarm means and the vibration of the operation member by the tactile information-presenting means are synchronized with each other. With this, the relationship between the first alarm and the second alarm is emphasized, whereby it is possible to cause the driver to more easily understand the relationship.

More preferably, the alarm means performs the first alarm on condition that the abnormal behavior of the vehicle is detected.

With the configuration of the preferred embodiment, when there are satisfied the condition that the attention level of the driver is lower than the predetermined level, and also the condition that the abnormal behavior of the vehicle is detected, the first alarm is performed together with the second alarm. With this, the second alarm via the tactile sense and the first alarm via the visual sense or auditory sense are simultaneously performed in a situation where the risk which is objectively determined based on the lowering of the estimated attention level of the driver matches the risk which the driver feels, so that the driver can accept both of the alarms clearly with the feeling of being convinced, whereby it is possible to enhance the trust of the driver.

Preferably, the attention calling system further comprises attention level display means for displaying the estimated attention level of the driver, and the alarm means performs the alarm by the tactile information-presenting means in a state in which the attention level of the driver lower than the predetermined level is displayed on the attention level display means.

With the configuration of the preferred embodiment, the estimated attention level of the driver is displayed, and in a state where the displayed attention level of the driver is lower than the predetermined level, the alarm by the tactile information-presenting means is performed. With this, the alarm by the tactile information-presenting means is performed while showing changes in the attention level until it becomes lower than the predetermined level, to the driver, and hence it is possible to cause the driver to easily understand that the tactile information has been presented due to reduction of attention of the driver.

Preferably, the attention calling system further comprises second abnormal behavior detection means for detecting a predetermined second abnormal behavior of the vehicle, which is higher in a degree of abnormality than the abnormal behavior of the vehicle, and when the second abnormal behavior of the vehicle has been detected, the alarm means performs the alarm by the tactile information-presenting means irrespective of the attention level of the driver.

With the configuration of the preferred embodiment, when there has been detected the predetermined second abnormal behavior of the vehicle, which is higher in the degree of abnormality than the abnormal behavior of the vehicle, the alarm by the tactile information-presenting means is performed irrespective of the attention level of the driver. This makes it possible to immediately and clearly call the attention of the driver to occurrence of the second abnormal behavior, whereby it is possible to ensure safe traveling of the vehicle.

More preferably, the alarm means inhibits the alarm by the tactile information-presenting means based on lowering of the attention level of the driver, until a predetermined time period elapses after the alarm by the tactile information-presenting means has been performed based on detection of the second abnormal behavior of the vehicle.

For example, in a case where the condition, such as the lowering of the attention level of the driver, is satisfied immediately after execution of the alarm by the tactile information-presenting means based on detection of the second abnormal behavior of the vehicle, even when the alarm by the tactile information-presenting means is performed based on the satisfaction of the condition, the current alarm and the immediately preceding alarm are difficult to distinguish therebetween (confusing). Therefore, the intention of calling the attention of the driver by the alarm is not accurately transmitted to the driver, which can lead to the driver's misunderstanding. With the configuration of the preferred embodiment, the alarm performed by the tactile information-presenting means based on lowering of the attention level of the driver is inhibited until the predetermined time period elapses after execution of the alarm by the tactile information-presenting means based on detection of the second abnormal behavior. Therefore, it is possible to positively avoid such inconveniences as described above.

The above and other objects, features, and advantages of the present invention will become more apparent from the following detailed description taken in conjunction with the accompanying drawings.

BRIEF DESCRIPTION OF THE DRAWINGS

FIG. 7 is a timing diagram showing an example of operation performed by the attention calling system; and FIG. 8 is a timing diagram showing details of a situation in which alarms are performed by the attention calling system.

DETAILED DESCRIPTION OF PREFERRED EMBODIMENTS

Figure 1:
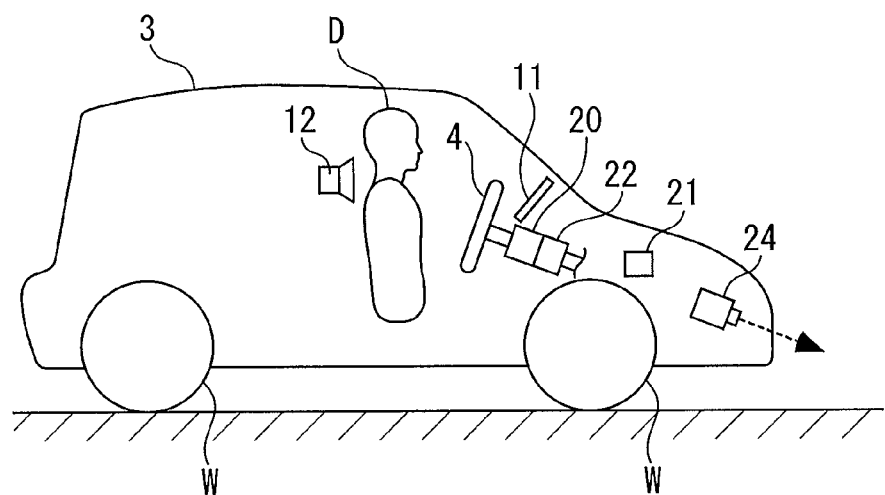
FIG. 1 is a schematic diagram of an attention calling system for a vehicle, to which the present invention is applied.
Figure 2:
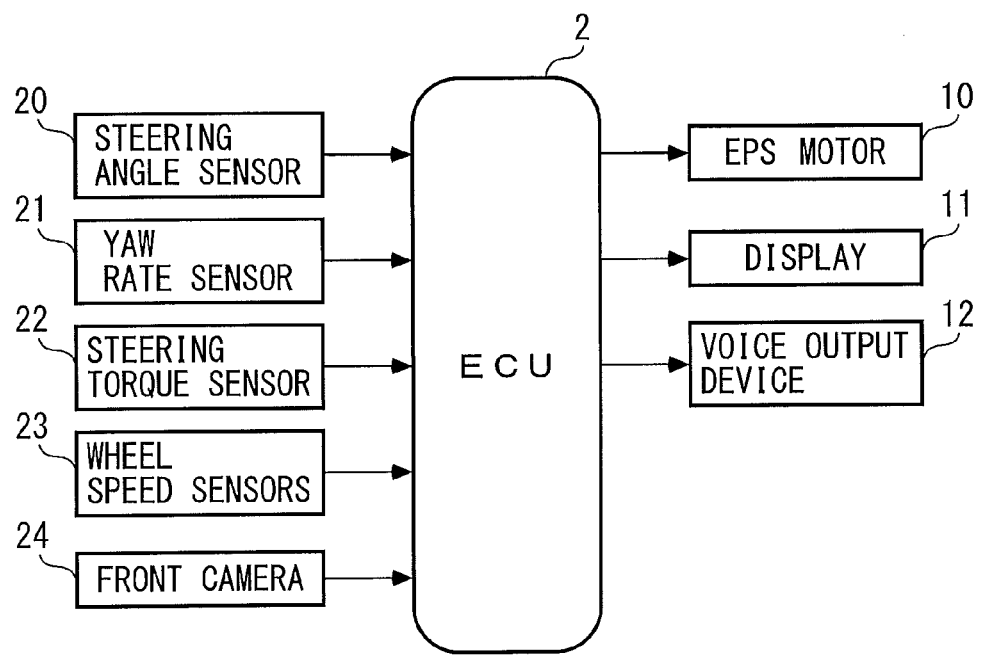
FIG. 2 is a block diagram of a control system of the attention calling system.

An attention calling system for a vehicle according to the present invention will be described with reference to the drawings. As shown in FIG. 1, a vehicle 3 is a four-wheel vehicle having four wheels W (only two of which are shown), and is equipped with an electric power steering system including an EPS motor 10 (see FIG. 2). The EPS motor 10 is connected to a steering wheel 4, and is driven under the control of an electronic control unit (hereinafter referred to as the "ECU") 2, for assisting a driver denoted by a reference numeral D to steer the steering wheel 4. As described hereinafter, the EPS motor 10 is also used as vibration means for vibrating the steering wheel 4 in order to present tactile information for calling attention of the driver.

The vehicle 3 is provided with a display 11 and a voice output device 12. The display 11 is disposed in an instrument panel (not shown), and displays various information transmitted from the ECU 2 on a monitor screen. As described hereinafter, the various information includes visual information on a determined attention level of the driver and visual information for calling the attention of the driver. The voice output device 12 is disposed e.g. reward of the driver, and outputs a voice message according to the attention level of the driver as auditory information for calling the attention of the driver.

Further, to detect a traveling state and an operated state of the vehicle 3, the vehicle 3 is provided with the following sensors. A steering angle sensor 20 detects a steering angle θs of the steering wheel 4, and delivers a detection signal indicative of the detected steering angle θs to the ECU 2. A yaw rate sensor 21 detects a yaw rate Yr of the vehicle 3, and delivers a detection signal indicative of the detected yaw rate Yr to the ECU 2. The ECU 2 integrates the input yaw rate Yr to thereby calculate an actual azimuth angle θa as an actual traveling direction of the vehicle 3.

A steering torque sensor 22 detects torque Ts generated when the steering wheel 4 is operated by the driver (hereinafter referred to as the "steering torque Ts") and delivers a detection signal indicative of the detected steering torque Ts to the ECU 2. Wheel speed sensors 23 (see FIG. 2) are provided for four wheels W, respectively, and each detect the rotational speed of an associated one of the wheels W to deliver a signal indicative of the detected rotational speed to the ECU 2. The ECU 2 calculates a vehicle speed VP based on the detection signals from the wheel speed sensors 23.

Further, a front camera 24 photographs a lane (white lines) on a road in front of the vehicle 3, and delivers an image signal indicative of the lane to the ECU 2. The ECU 2 calculates a target azimuth angle θd, which indicates a direction in which the vehicle 3 should travel, based on the image signal.

The ECU 2 is implemented by a microcomputer comprised of an I/O interface, a CPU, a RAM, and a ROM (none of which are specifically shown). The ECU 2 determines the behavior of the vehicle 3 and the attention level of the driver according to the detection signals from the above-described sensors 20 to 23, the image signal from the front camera 24, and so forth, and performs an attention calling process for calling the attention of the driver based on results of the determinations.

Note that in the present embodiment, the ECU 2 corresponds to attention level estimation means, abnormal behavior detection means, alarm means, and second abnormal behavior detection means.

Figure 3:
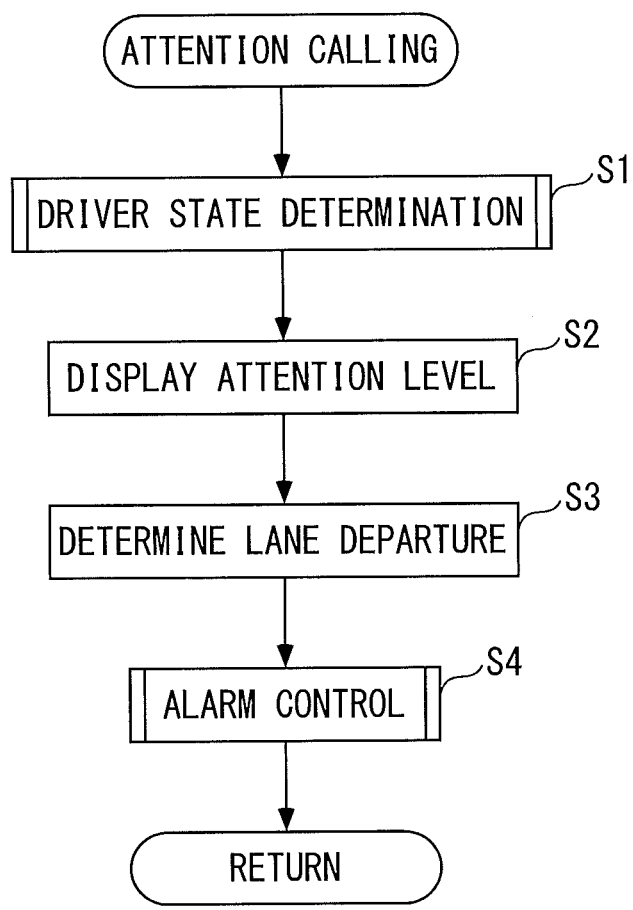
FIG. 3 is a main flowchart of an attention calling process.

FIG. 3 shows a main flowchart of the attention calling process performed by the ECU 2. The present process is executed at predetermined time intervals. In the present process, first, in a step 1 (shown as S1 in abbreviated form in FIG. 3; the following steps are also shown in abbreviated form), a driver state determination process is performed. This determination process calculates an attention level ATT_LVL of the driver to driving the vehicle 3, and determines whether or not unstableness of the vehicle 3 has occurred.

Figure 4:
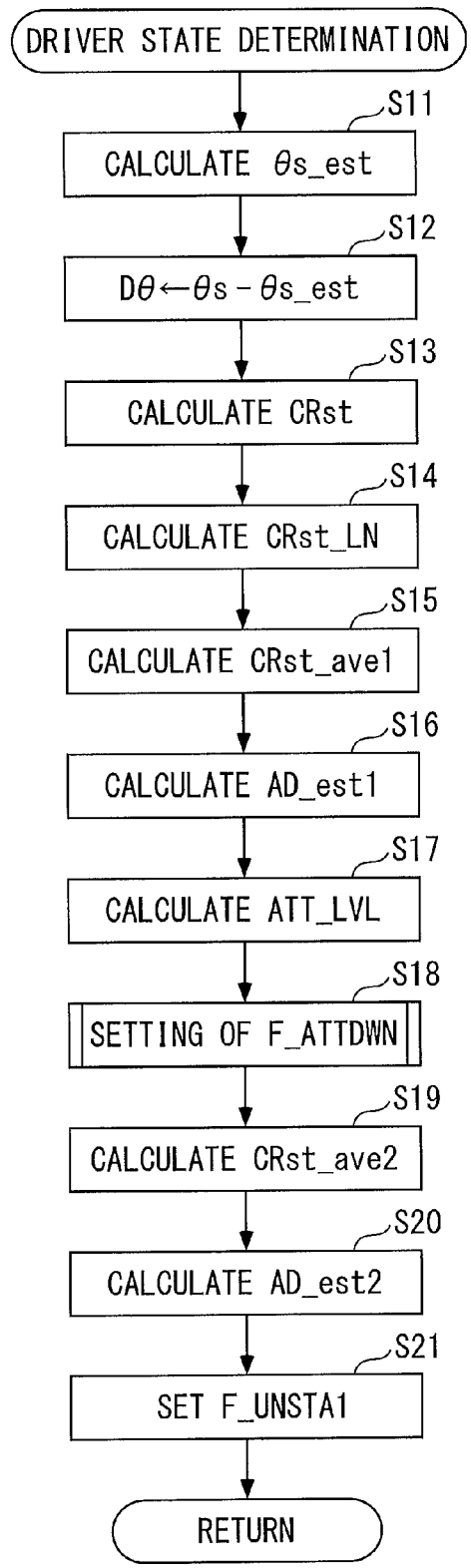
FIG. 4 is a flowchart of a driver state determination process.

FIG. 4 shows a subroutine for the driver state determination process. In the present process, first, in a step 11, an estimated steering angle θs_est is calculated. More specifically, the actual azimuth angle θa is calculated based on an integral value of the yaw rate Yr detected by the yaw rate sensor 21. Then, a target azimuth angle θd is calculated based on the image signal from the front camera 24, and a difference (θa−θd) between the actual azimuth angle θa and the target azimuth angle θd is calculated as an azimuth angle difference Dθd.

Subsequently, a driver model is defined to which is input the azimuth angle difference Dθd and from which is output the estimated steering angle θs_est, and model parameters of the driver model are calculated onboard with a predetermined identification algorithm (e.g. a least-square method algorithm). Then, the estimated steering angle θs_est is calculated by substituting the calculated model parameters and the above-mentioned azimuth angle difference Dθd into the driver model.

Then, the process proceeds to a step 12, wherein a difference (θs−θs_est) between the steering angle θs detected by the steering angle sensor 20 and the estimated steering angle θs_est is calculated as a steering angle difference Dθ.

Next, the process proceeds to a step 13, wherein a correction steering amount CRst is calculated by the following equation (1):

$$CRst = \sqrt{\frac{1}{m}\sum_{j=1}^{m}(D\theta_j)^2} \qquad (1)$$

In the equation (1), m represents an integer not smaller than 2. As expressed by the equation (1), the correction steering amount CRst is calculated as a mean squared error (i.e. a root mean square) of m steering angle differences Dθ calculated at respective control times up to the current control time.

In a step 14 following the step 13, a learned value CRst_LN of the correction steering amount (hereinafter referred to as the "learned correction steering amount CRst_LN") is calculated. The learned correction steering amount CRst_LN is calculated as a minimum value of values of the correction steering amount CRst calculated at respective control times up to the current control time. More specifically, the correction steering amount CRst calculated in the step 13 and the learned correction steering amount CRst_LN stored in the RAM are compared, and a smaller one of the two amounts is set as the learned correction steering amount CRst_LN. Note that the learned correction steering amount CRst_LN is reset, in cases, such as a case where an ignition switch is turned off, a case where a seat belt of a driver's seat is removed or a driver seat door is opened in the ON state of the ignition switch, because there is a possibility that the driver is changed.

Then, the process proceeds to a step 15, wherein a first average correction steering amount CRst_ave1 is calculated. The first average correction steering amount CRst_ave1 is calculated as a moving average value of values of the correction steering amounts CRst calculated at respective control times up to the current control time during a predetermined sampling time period.

Next, the process proceeds to a step 16, wherein a first estimated alertness degree AD_est1 is calculated by the following equation (2):

$$AD\_est1 = \frac{CRst\_ave1}{CRst\_LN} \quad (2)$$

As expressed by the equation (2), the first estimated alertness degree AD_est1 is represented by a ratio between the first average correction steering amount CRst_ave1 and the learned correction steering amount CRst_LN, and hence is calculated as a larger value as the first average correction steering amount CRst_ave1 is relatively larger.

Next, the process proceeds to a step 17, wherein the attention level ATT_LVL is calculated. The calculation of the attention level ATT_LVL is performed by converting the first estimated alertness degree AD_est1 calculated in the step 16 by a predetermined conversion equation (not shown).

With this conversion, the attention level ATT_LVL is calculated as a smaller value as the first estimated alertness degree AD_est1 is larger. This is because it is estimated from the above-mentioned calculation method that the attention of the driver is reduced as the first estimated alertness degree AD_est1 is larger since the fact that the first estimated alertness degree AD_est1 is large indicates that changes in the steering angle θs are large. As a consequence, the attention level ATT_LVL is calculated as a smaller value as the attention of the driver is estimated to be lower.

Further, the attention level ATT_LVL is set within a range of 0 to 5. As indications of the evaluation of the attention of the driver, ATT_LVL=5 corresponds to "concentrated", ATT_LVL=4 corresponds to "normal", ATT_LVL=3 corresponds to "inattentive", ATT_LVL=2 corresponds to "sleepy", and ATT_LVL=1 corresponds to "drowsy".

Figure 5:
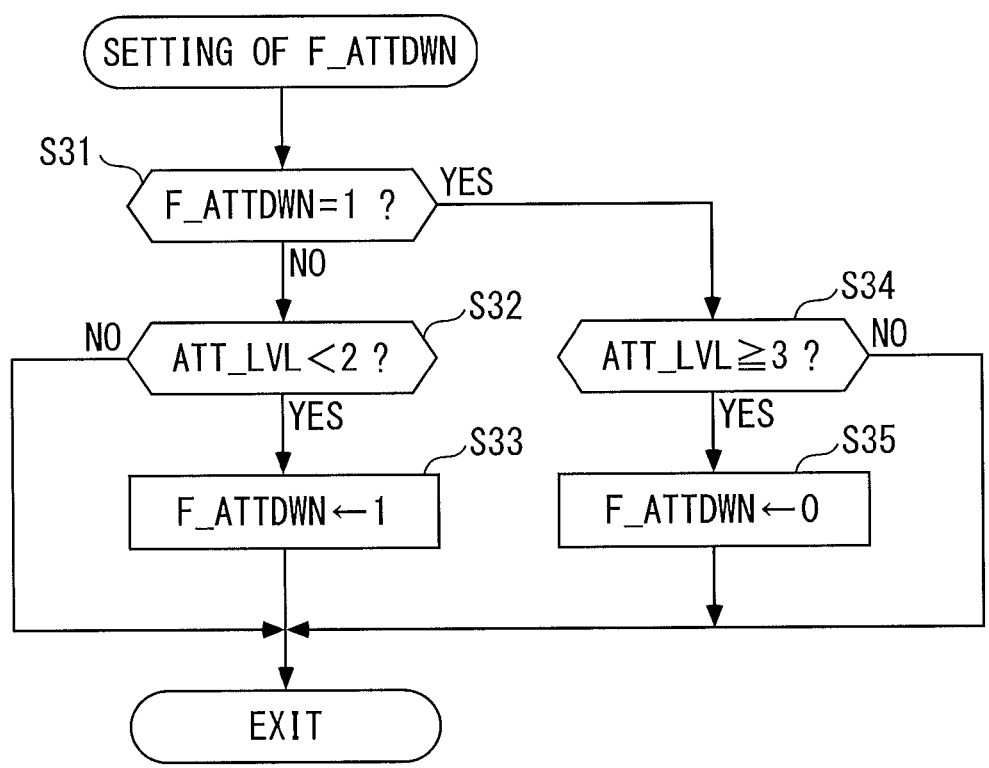
FIG. 5 is a flowchart of a process for setting a low attention flag.

Then, in a step 18, a process for setting a low attention flag F_ATTDWN is performed. FIG. 5 shows a subroutine for this process. In the present process, first, it is determined in a step 31 whether or not the low attention flag F_ATTDWN is currently equal to 1. If the answer to this question is negative (NO), it is determined whether or not the attention level ATT_LVL calculated in the step 17 is lower than 2 (step 32).

If the answer to this question is negative (NO), the present process is immediately terminated. On the other hand, if the answer to the question of the step 32 is affirmative (YES), i.e. if the attention level ATT_LVL calculated in the step 17 is lower than 2, it is determined that the attention level ATT_LVL has been lowered, and in a step 33, the low attention flag F_ATTDWN is set to 1.

When the answer to the question of the above-mentioned step 31 becomes affirmative (YES) in accordance with execution of the step 33, the process proceeds to a step 34, wherein it is determined whether or not the attention level ATT_LVL is not lower than 3. If the answer to this question is negative (NO), the present process is immediately terminated. On the other hand, if the answer to the question of the step 34 is affirmative (YES), i.e. if the attention level ATT_LVL has become not lower than 3, it is determined that the attention of the driver is restored, and the process proceeds to a step 35, wherein the low attention flag F_ATTDWN is reset to 0.

As described above, the low attention flag F_ATTDWN is set to 1 when the attention level ATT_LVL becomes lower than 2, and is then held at 1 until the attention level ATT_LVL is restored to a value not lower than 3.

Referring again to FIG. 4, in a step 19 following the step 18, a second average correction steering amount CRst_ave2 is calculated. The second average correction steering amount CRst_ave2 is calculated as a moving average value of values of the correction steering amount CRst calculated at respective control times up to the current control time during a predetermined sampling time period shorter than the predetermined sampling time period of the first average correction steering amount CRst_ave1.

Next, the process proceeds to a step 20, wherein a second estimated alertness degree AD_est2 is calculated by the following equation (3):

$$AD\_est2 = \frac{CRst\_ave2}{CRst\_LN} \quad (3)$$

As expressed by the equation (3), the second estimated alertness degree AD_est2 is represented by a ratio between the second average correction steering amount CRst_ave2 and the learned correction steering amount CRst_LN, and hence is calculated as a larger value as the second average correction steering amount CRst_ave2 is relatively larger.

Finally, in a step 21, an unstableness flag F_UNSTA1 is set according to the calculated second estimated alertness degree AD_est2, followed by terminating the present process. More specifically, if the second estimated alertness degree AD_est2 is not smaller than a predetermined determination value AD_JUD, it is determined that unstableness (abnormal behavior) of the vehicle 3 has occurred, and the unstableness flag F_UNSTA1 is set to 1, whereas if the second estimated alertness degree AD_est2 is smaller than the determination value AD_JUD, it is determined that the vehicle 3 is not unstable, but is in a stable traveling state, and hence the unstableness flag F_UNSTA1 is set 0.

Referring again to FIG. 3, in a step 2 following the step 1, a process for displaying the attention level ATT_LVL is performed. First, a display rank DPY_LNK is assigned to each attention level ATT_LVL. As indicated by circled numerals in respective displays of (b) in FIG. 7, when 4<ATT_LVL≤5 holds, the display rank DPY_LNK is set to 5; when 3<ATT_LVL≤4 holds, it is set to 4; when $2 < ATT\_LVL \leq 3$ holds, it set to 3; when $1 < ATT\_LVL \leq 2$ holds, it set to 2; and when $ATT\_LVL \leq 1$ holds, it set to 1.

As shown in (b) of FIG. 7, the attention level ATT_LVL is displayed in a level meter on a monitor screen of the display 11 according to the display rank DPY_LNK (gauge display). Further, the color of the monitor display is changed according to the display rank DPY_LNK. For example, the display ranks DPY_LNK=5, 4, 3, 2, and 1 are displayed in the respective colors of green, yellow green, yellow, orange, and red.

Note that the display of the attention level ATT_LVL on the display 11 is performed on condition that the vehicle speed VP is not lower than a first predetermined speed and at the same time not higher than a second predetermined speed higher than the first predetermined speed, that is, when the vehicle 3 is not in a low-speed driving condition or in a high-speed driving condition.

In a step 3 following the step 2 in FIG. 3, determination of lane departure of the vehicle 3 is performed. More specifically, it is determined based on the image signal from the front camera 24 whether or not lane departure (second abnormal behavior) of the vehicle 3 has occurred, i.e. whether or not the vehicle 3 is crossing the lane regardless of an intention of the driver. If it is determined that lane departure has occurred, a lane departure flag F_UNSTA2 is set to 1, and otherwise it is set to 0.

Figure 6:
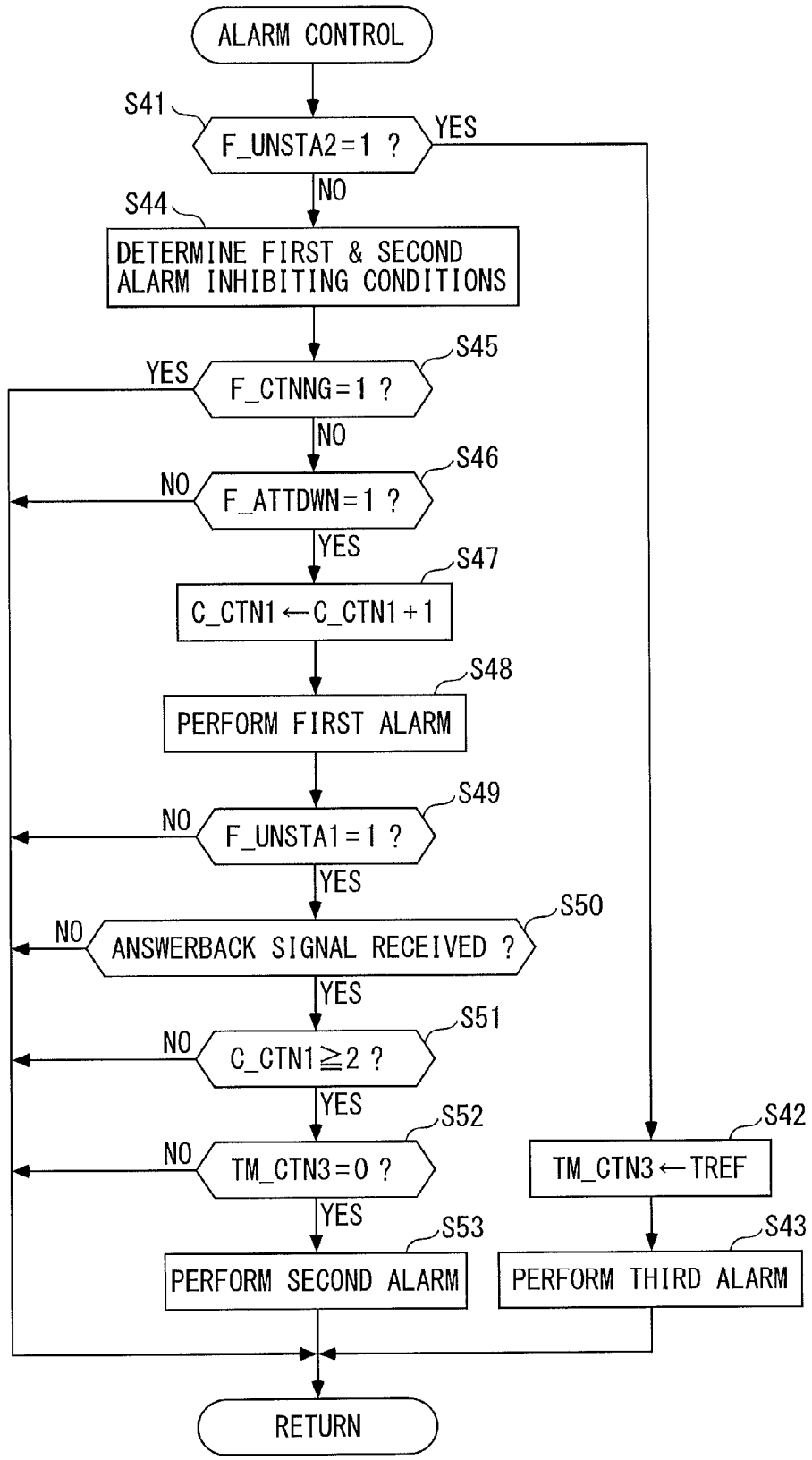
FIG. 6 is a flowchart of an alarm control process.

Next, in a step 4, an alarm control process shown in FIG. 6 is performed. The alarm control process is performed for raising various alarms for calling the attention of the driver according to the attention level ATT_LVL which has been calculated and determined so far and whether or not unstableness and lane departure of the vehicle 3 have occurred.

The alarms include a first alarm which is raised to cause the driver to think of taking a rest when it is determined that the attention of the driver is reduced. The first alarm includes an alarm by display on the display 11 (presentation of visual information) (hereinafter referred to as the "visual first alarm"), and an alarm by output of a voice message from the voice output device 12 (presentation of auditory information) (hereinafter referred to as the "auditory first alarm"). The above-described alarms further include an alarm by vibration of the steering wheel 4 (presentation of tactile information), which is performed when it is determined that unstableness of the vehicle 3 has occurred (hereinafter referred to as the "second alarm"), and an alarm by vibration of the steering wheel 4, which is performed when it is determined that lane departure of the vehicle 3 has occurred (hereinafter referred to as the "third alarm").

Referring to FIG. 6, in the alarm control process, first, it is determined in a step 41 whether or not the lane departure flag F_UNSTA2 is equal to 1. If the answer to this question is affirmative (YES), i.e. if it is determined that lane departure of the vehicle 3 has occurred, the process proceeds to a step 42, wherein a value TM_CTN3 of a down-count timer for counting a time period elapsed after execution of the third alarm is set to a predetermined time period TREF.

Next, in a step 43, the third alarm is performed, followed by terminating the present process. More specifically, a drive signal is delivered to the EPS motor 10, to cause the EPS motor 10 to move in a reciprocating manner at a predetermined repetition period. This vibrates the steering wheel 4. The vibration is transmitted to fingertips of the driver so as to be presented as tactile information. As described above, when it is determined that lane departure of the vehicle 3 has occurred, the third alarm is immediately executed in order to ensure safe traveling of the vehicle 3.

If the answer to the question of the above-mentioned step 41 is negative (NO), the process proceeds to a step 44, wherein it is determined whether or not conditions for inhibiting the first and second alarms are satisfied. As the inhibiting conditions, there are set the following three conditions:

(a) After a direction indicator is turned on, a predetermined time period has not elapsed.

(b) After the difference between the actual azimuth angle $\theta a$ and the target azimuth angle $\theta d$ becomes equal to or larger than a predetermined value, a predetermined time period has not elapsed.

(c) After the amount of change in the steering torque Ts becomes equal to or larger than a predetermined amount, a predetermined time period has not elapsed.

If at least one of the conditions (a) to (c) is satisfied, it is determined that the conditions for inhibiting the first and second alarms are satisfied, and an alarm inhibition flag F_CTNNG is set to 1. On the other hand, if none of the conditions (a) to (c) are satisfied, it is determined that the conditions for inhibiting the first and second alarms are not satisfied, and the alarm inhibition flag F_CTNNG is set to 0.

Note that the aim of setting the above-described conditions (a) to (c) is as follows: As described hereinabove, the attention level ATT_LVL is basically calculated based on a relative relationship between the estimated steering angle $\theta s\_est$ defined by the driver model and an actual steering angle $\theta s$ on which the driver's attention is reflected, and hence situations are assumed in which the steering amount is increased by a cause other than reduction of the driver's attention, and the situations are set as the inhibiting conditions. More specifically, the condition (a) is set assuming e.g. a time when the vehicle changes lanes, the condition (b) is set assuming e.g. a time when the vehicle enters and leaves a curve of a lane, and the condition (c) is set assuming e.g. a time when the vehicle is traveling over a bump or on a bad road.

In a step 45 following the above-mentioned step 44, it is determined whether or not the alarm inhibition flag F_CTNNG is equal to 1. If the answer to this question is affirmative (YES), i.e. if the first and second alarms are inhibited, the present process is immediately terminated.

On the other hand, if the answer to the question of the step 45 is negative (NO), the process proceeds to a step 46, wherein it is determined whether or not the low attention flag F_ATTDWN is equal to 1. If the answer to this question is negative (NO), the present process is immediately terminated, whereas if the answer to the question of the step 46 is affirmative (YES), i.e. if the driver's attention is reduced, the process proceeds to a step 47, wherein a counter value C_CTN1 is incremented, and then in a step 48, the first alarm (the visual first alarm and the auditory first alarm) is performed. The above-mentioned counter value C_CTN1 is reset to 0 when the ignition switch is turned on, and hence represents the number of times of execution of the first alarm during the present drive cycle.

The above-mentioned visual first alarm is specifically performed by delivering a display request signal from the ECU 2 to the display 11, thereby causing a predetermined pattern (e.g. of a coffee cup) to be displayed on the monitor screen of the display 11, by interruption, for causing the driver to think of taking a rest. Note that when this monitor display is actually performed, an answerback signal for confirming the fact is delivered from the display 11 to the ECU 2 (see FIG. 8).

Further, the auditory first alarm is performed by delivering an output request signal from the ECU 2 to the voice output device 12, thereby causing a predetermined voice message (e.g. saying that "Won't you take a break?", indicated by a note symbol in FIG. 7) to be output from the voice output device 12, for causing the driver to think of taking a rest.

Referring again to FIG. 6, in steps 49 to 52 following the above-mentioned step 48, it is determined whether or not conditions for executing the second alarm are satisfied. More specifically, it is determined whether or not the unstableness flag F_UNSTA1 is equal to 1 (step 49), whether or not the answerback signal has been received from the display 11 (step 50), whether or not the above-mentioned counter value C_CTN1 is equal to or larger than 2 (step 51), and whether or not a timer value TM_CTN3 is equal to or smaller than 0 (step 52).

If any of the answers to the questions of the above steps is negative (NO), it is determined that the conditions for executing the second alarm are not satisfied, and the present process is immediately terminated. On the other hand, if the answers to the question of the steps 49 to 52 are all affirmative (YES), it is determined that the conditions for executing the second alarm are satisfied, and the second alarm is performed in a step 53, followed by terminating the present process. The content itself of the second alarm is the same as that of the third alarm, i.e. vibration of the steering wheel 4 caused by the EPS motor 10.

As described above, the second alarm is performed on condition not only that the first alarm is being performed but also that it is determined in the above-mentioned steps 49 to 52 that unstableness of the vehicle 3 has occurred (step 49), the answerback signal has been received from the display 11 (step 50), the first alarm is being performed for a second or subsequent time in the present drive cycle of the vehicle 3 (step 51), and the predetermined time period TREF has elapsed after execution of the third alarm (step 52).

Next, with reference to FIGS. 7 and 8, an example of operation performed by the above-described attention calling process will be described together with more specific details of the operation. As described hereinbefore, in the attention calling process, the attention level ATT_LVL is calculated within the range of 0 to 5, and results of the calculation are displayed on the monitor screen of the display 11 on a scale from 1 to 5 in the level meter ((b) of FIG. 7). Further, when the attention level ATT_LVL is lower than 2, it is determined that the attention of the driver is reduced, and from then on, the low attention flag F_ATTDWN ((c) of FIG. 7) is set to 1 until the attention level ATT_LVL is restored to a value not smaller than 3. Further, when it is determined that unstableness of the vehicle 3 has occurred, the unstableness flag F_UNSTA1 ((d) of FIG. 7) is set to 1.

In this example, between time points t1 and t3, although the attention level ATT_LVL is lowered, the value thereof is not lower than 2, and hence the low attention flag F_ATTDWN is set to 0. Therefore, the answer to the question of the step 46 becomes negative (NO), and the first alarm is not performed. Further, at a time point t2 between the time points t1 and t3, although the unstableness flag F_UNSTA1 is set to 1, the first alarm is not being performed, and hence the second alarm is not performed either.

After that, at the time point t3, when the attention level ATT_LVL becomes lower than 2, the low attention flag F_ATTDWN is set to 1, and accordingly, the answer to the question of the step 46 in FIG. 6 becomes affirmative (YES), so that the first alarm is performed.

More specifically, when the low attention flag F_ATTDWN is set to 1, as shown in (g) of FIG. 8, the display request signal is delivered from the ECU 2 to the display 11 for a predetermined time period (time point t11). When the display request signal is input (time point t12), the pattern of a coffee cup for causing the driver to think of taking a rest is displayed on the monitor screen of the display 11 (hereinafter referred to as the "monitor display"), whereby the visual first alarm ((h) of FIG. 8) is performed. This monitor display is continued for a predetermined time period (from t12 to t16). Further, when the monitor display is actually performed, an answerback signal ((i) of FIG. 8) for confirming the fact is delivered from the display 11 to the ECU 2 for a predetermined time period. Furthermore, the above-mentioned voice message (hereinafter referred to as the "voice output") is output from the voice output device 12 substantially at the same timing as the timing of the monitor display, whereby the auditory first alarm is performed.

In the example illustrated in FIG. 7, the above-described operation is repeatedly performed during a time period (t3 to t7) over which the low attention flag F_ATTDWN is set to 1, whereby the first alarm (the visual first alarm and the auditory first alarm) is performed three times in total. In a case where the first alarm is performed a plurality of times as described above, it is preferable to change the content of the first alarm such that the degree of causing the driver to think of taking a rest is increased as the number of times of execution of the first alarm is increased.

Therefore, in the present embodiment, the color of the monitor display is set to e.g. white when the first alarm is performed for a first time, and is set to red when the first alarm is performed for a second or subsequent time. Further, the voice message as well is set to e.g. the message saying "Won't you take a break?" when the first alarm is performed for the first time, and is set to a message saying "Take a break" when the first alarm is performed for the second or subsequent time. Further, from the same point of view, a time interval of execution of the first alarm may be changed according to the number of times of execution of the first alarm. In the present embodiment, as shown in (e) of FIG. 7, the time interval of execution of the first alarm between the second time and a third time is set to be shorter than that between the first time and the second time.

Further, in the example illustrated in FIG. 7, during execution of the first alarm in each of the three times, the unstableness flag F_UNSTA1 is set to 1 (t4, t5, and t6). In this case, when the unstableness flag F_UNSTA1 is set to 1 for the first time, the answer to the question of the step 51 in FIG. 6 becomes negative (NO) since the first alarm is executed only for the first time, so that the second alarm is not performed. On the other hand, when the unstableness flag F_UNSTA1 is set for the second and third times (t5 and t6), the answer to the question of the step 51 becomes affirmative (YES) since the first alarm is performed for the second and subsequent times, so that the second alarm is performed ((f) of FIG. 7).

Details of operation of the second alarm are shown in (j) of FIG. 8. After the answerback signal ((i) of FIG. 8) is received from the display 11 (time point t13), when a predetermined time period has elapsed (time point t14), the vibration of the steering wheel 4 is started by driving the EPS motor 10 to perform the second alarm. The end time of vibration of the steering wheel 4 is set to a time point (time point t15) before the end time (time point t16) of the monitor display. As a consequence, the vibration of the steering wheel 4 is performed within the time period of the monitor display, i.e. in a state where the monitor display is being actually performed.

Further, as shown in (j) of FIG. 8, the vibration of the steering wheel 4 is intermittently performed a plurality of times (three times in the illustrated example), and although not shown, the monitor display is flashed in synchronism with the vibration whenever the vibration is performed.

After that, at the time point t7, when the attention level ATT_LVL becomes equal to or higher than 3, the low attention flag F_ATTDWN is reset to 0, and accordingly, the answer to the question of the step 46 in FIG. 7 becomes negative (NO), so that the first alarm is stopped. Further, the second alarm is not performed insofar as the first alarm is not performed.

As described hereinabove, according to the present embodiment, the second alarm is performed on condition not only that the estimated attention level ATT_LVL of the driver becomes lower than a predetermined level (=2), but also that it is determined that unstableness of the vehicle 3 has occurred. As a consequence, the second alarm is performed in a state where a risk which is objectively determined based on the lowering of the estimated attention level ATT_LVL of the driver matches a risk which the driver feels due to the unstableness of the vehicle 3, so that the driver can accept the second alarm without a feeling of strangeness but with a feeling of being convinced. Further, as the second alarm, tactile information having a strong stimulus and a high messaging property, which is provided by the vibration of the steering wheel 4, is given to the driver. This makes it possible to perform the second alarm by presenting the tactile information to the driver while causing the driver to have a feeling of being convinced and a feeling of trust, thereby making it possible to effectively and appropriately call the attention of the driver.

Further, when the attention level ATT_LVL of the driver becomes lower than the predetermined level, the first alarm (the visual first alarm and the auditory first alarm) is performed in advance for causing the driver to think of taking a rest using the monitor display on the display 11 and the voice output from the voice output device 12, and thereafter, on condition that the first alarm has been performed two or more times, the second alarm is performed. The first alarm by the monitor display and the voice output is thus performed in advance, whereby the driver can smoothly accept the second alarm without a feeling of abruptness, and hence it is possible to further enhance the driver's feeling of being convinced and trust, and more effectively call the attention of the driver by the second alarm.

Furthermore, the second alarm is performed during execution of the first alarm and simultaneously therewith, particularly on condition that the answerback signal has been received, whereby it is performed in the state where the monitor display is actually being performed by the visual first alarm. As a consequence, the driver can understand the relationship between the two alarms more easily, particularly the relationship therebetween that the second alarm is performed due to lowering of the attention level indicated by the first alarm, whereby it is possible to further enhance the driver's feeling of being convinced and trust, and more effectively call the attention of the driver by the second alarm. Further, when the second alarm is performed, the vibration of the steering wheel 4 and flashing of the monitor display are synchronized with each other, and hence the relationship between the first and second alarms is emphasized, whereby it is possible to cause the driver to more easily understand the relationship.

Further, the second alarm is performed in the state where the estimated attention level ATT_LVL of the driver is displayed on the display 11 in the level meter, and the displayed attention level ATT_LVL is lower than the predetermined level. With this, the second alarm is performed while showing changes in the attention level ATT_LVL until it becomes lower than the predetermined level, to the driver, so that it is possible to cause the driver to more easily understand that the second alarm has been performed due to reduction of attention of the driver.

Furthermore, when it is determined that lane departure of the vehicle 3 has occurred, the third alarm is performed using the vibration of the steering wheel 4 irrespective of the estimated attention level ATT_LVL of the driver. This makes it possible to immediately and clearly call the attention of the driver to the lane departure of the vehicle 3, whereby it is possible to ensure safe traveling of the vehicle 3. Further, the second alarm based on reduction of the attention level ATT_LVL of the driver is inhibited until the predetermined time period TREF has elapsed after execution of the third alarm, so that it is possible to positively prevent misunderstanding of the driver from being caused by confusion of the two alarms.

Note that the present invention is by no means limited to the above-described embodiment, but it can be practiced in various forms. For example, although in the embodiment, the first alarm is performed, in advance of the second alarm, on condition that the estimated attention level ATT_LVL of the driver is lower than the predetermined level, instead of this, similar to the second alarm, the first alarm may be performed on further condition that it is determined that unstableness of the vehicle 3 has occurred. With this, the first and second alarms are simultaneously performed in the state where the risk which is objectively determined based on the lowering of the estimated attention level ATT_LVL of the driver matches the risk which the driver feels, so that the driver can accept the first and second alarms in a positively convinced manner, whereby it is possible to enhance the trust of the driver.

Further, although in the embodiment, the second alarm is performed on condition that the first alarm is performed two or more times, the second alarm may be performed when the first alarm is performed for the first time. Alternatively, the strength of the second alarm may be changed according to the number of times of execution of the second alarm. For example, the second alarm may be made stronger as the number of times of execution thereof is increased. Further, although in the embodiment, the second alarm is performed using the vibration of the steering wheel 4, any suitable vibration may be employed insofar as it presents tactile information to the driver (appeals to the sense of touch of the driver). For example, the second alarm may be performed using the vibration of a driver's seat or that of an accelerator pedal.

Further, although in the embodiment, in addition to the second alarm, the display of the level meter based on the attention level ATT_LVL and the first alarm are performed, both or one of the level meter display and the first alarm may be omitted.

Furthermore, although in the embodiment, as the first alarm, the visual first alarm using the monitor display and the auditory first alarm using the voice output are both performed, one of these two alarms may be performed. Further, although in the embodiment, the content of the monitor display and the content of the voice output are made different between the first alarm for the first time and the first alarm for the second or subsequent time, they may be the same therebetween.

Further, the content of the monitor display and that of the voice output, the number of times of execution thereof, and the time interval of execution thereof in the embodiment are given only by way of example, and various changes and modifications may be made thereto. For example, with regard to the monitor display, the pattern and the colors described in the embodiment may be replaced by any other suitable patterns and colors. Further, with regard to the voice output, the voice messages may be replaced by simple warning sounds. In this case, the warning sounds may be synchronized with the vibration of the steering wheel used for the second alarm.

Furthermore, although in the embodiment, the low attention flag F_ATTDWN representing reduction of attention of the driver is held at 1 until the attention level ATT_LVL is restored to a value not smaller than 3 after it has become lower than 2, a single predetermined level may be set as a threshold value without providing such hysteresis.

Further, the method of estimating the attention level ATT_LVL of the driver, described in the embodiment, and the methods of determining the unstableness and the lane departure of the vehicle 3 are given only by way of example, and any other suitable methods can be employed. Further, although in the embodiment, the unstableness of the vehicle 3 is used as the abnormal behavior of the vehicle 3, and the lane departure of the vehicle 3 is used as the second abnormal behavior of the vehicle 3, it is to be understood that the abnormal behaviors are not limited thereto.

It is further understood by those skilled in the art that the foregoing are preferred embodiments of the invention, and that various changes and modifications may be made without departing from the spirit and scope thereof.

What is claimed is:

1. An attention calling system for a vehicle, which calls attention of a driver when an attention level of the driver to driving the vehicle is lowered, comprising:
    attention level estimation means for estimating the attention level of the driver;
    abnormal behavior detection means for detecting a predetermined abnormal behavior of the vehicle; and
    alarm means including tactile information-presenting means for presenting tactile information via a tactile sense to the driver and a first alarm means for presenting information via at least one of an auditory sense and a visual sense to the driver,
    wherein said alarm means performs a presentation of the information by said first alarm means, as a first alarm, when the estimated attention level of the driver has become lower than a predetermined level, and performs a presentation of the tactile information by said tactile information-presenting means, as a second alarm, on condition that the attention level of the driver is lower than the predetermined level, the abnormal behavior of the vehicle is detected, and the first alarm has been performed at least once within a predetermined driving time period of the vehicle,
    wherein said attention level estimation means estimates the attention level of the driver, using steering amount parameters indicative of a steering amount by the driver acquired during a first predetermined acquiring time period, and
    wherein said abnormal behavior detection means detects the predetermined abnormal behavior of the vehicle, using the steering amount parameters acquired during a second predetermined acquiring time period shorter than the first predetermined acquiring time period.

2. The attention calling system according to claim 1, further comprising correction steering amount calculation means for calculating a correction steering amount indicative of a degree of correction of the steering amount by the driver, using the steering amount parameter,
    wherein said attention level estimation means estimates the attention level of the driver, based on a first average correction steering amount that is an average value of the correction steering amounts calculated during the first predetermined acquiring time period, and
    wherein said abnormal behavior detection means detects the predetermined abnormal behavior of the vehicle, based on a second average correction steering amount that is an average value of the correction steering amounts calculated during the second predetermined acquiring time period.

3. The attention calling system according to claim 2, wherein said alarm means performs the second alarm on condition that the first alarm is currently being performed.

4. The attention calling system according to claim 3, wherein said tactile information-presenting means is configured to present the tactile information to the driver by vibrating an operation member operated by the driver, and wherein when said alarm means performs the second alarm during execution of the first alarm, said alarm means synchronizes the presentation of the information by said first alarm means and vibration of the operation member by said tactile information-presenting means with each other.

5. The attention calling system according to claim 2, wherein said alarm means performs the first alarm on condition that the abnormal behavior of the vehicle is detected.

6. The attention calling system according to claim 1, further comprising an attention level display means for displaying the estimated attention level of the driver, and wherein said alarm means performs the alarm by said tactile information-presenting means in a state in which the attention level of the driver lower than the predetermined level is displayed on said attention level display means.

7. The attention calling system according to claim 1, further comprising second abnormal behavior detection means for detecting a predetermined second abnormal behavior of the vehicle, which is higher in a degree of abnormality than the abnormal behavior of the vehicle, and wherein when the second abnormal behavior of the vehicle has been detected, said alarm means performs the alarm by said tactile information-presenting means irrespective of the attention level of the driver.

8. The attention calling system according to claim 7, wherein said alarm means inhibits the alarm by said tactile information-presenting means based on lowering of the attention level of the driver, until a predetermined time period elapses after the alarm by said tactile information-presenting means has been performed based on detection of the second abnormal behavior of the vehicle.

* * * * *